(12) United States Patent
Alfaro, Jr. et al.

(10) Patent No.: US 12,274,257 B2
(45) Date of Patent: Apr. 15, 2025

(54) WILDLIFE GUARD ASSEMBLIES FOR LINE POST INSULATORS

(71) Applicant: Hubbell Incorporated, Shelton, CT (US)

(72) Inventors: Paul Alfaro, Jr., Orange, CA (US); Kyle Randy Herman, Lake Forrest, CA (US)

(73) Assignee: Hubbell Incorporated, Shelton, CT (US)

( * ) Notice: Subject to any disclaimer, the term of this patent is extended or adjusted under 35 U.S.C. 154(b) by 174 days.

(21) Appl. No.: 18/047,422

(22) Filed: Oct. 18, 2022

(65) Prior Publication Data

US 2023/0119219 A1    Apr. 20, 2023

Related U.S. Application Data (60) Provisional application No. 63/256,770, filed on Oct. 18, 2021.

(51) Int. Cl.
*A01M 29/30* (2011.01)
*H01B 17/38* (2006.01)

(52) U.S. Cl.
CPC ............. *A01M 29/30* (2013.01); *H01B 17/38* (2013.01)

(58) Field of Classification Search
CPC ............................... A01M 29/30; H01B 17/38
USPC ..................................................... 174/138 R
See application file for complete search history.

(56) References Cited

U.S. PATENT DOCUMENTS

| | | | |
|---|---|---|---|
| 3,835,238 | A | 9/1974 | West |
| 6,005,196 | A | 12/1999 | Spillyards |
| 6,995,313 | B1 | 2/2006 | Barnett et al. |
| 9,960,586 | B2 | 5/2018 | Niles |
| 2012/0255503 | A1 | 10/2012 | Spencer |
| 2014/0262434 | A1 | 9/2014 | Stransky et al. |
| 2015/0229113 | A1 | 8/2015 | Dobrinski et al. |
| 2016/0111863 | A1 | 4/2016 | Williams et al. |
| 2018/0316171 | A1 | 11/2018 | Niles et al. |
| 2020/0303911 | A1 | 9/2020 | McGowan et al. |

FOREIGN PATENT DOCUMENTS

| | | |
|---|---|---|
| CN | 112599314 | 4/2021 |
| CN | 112806350 | 5/2021 |
| CN | 113197195 | 8/2021 |
| CN | 113725793 | 11/2021 |
| CN | 214629436 U | 11/2021 |
| CN | 113964719 A | 1/2022 |

(Continued)

*Primary Examiner* — Tremesha W Burns
(74) *Attorney, Agent, or Firm* — Ruggiero McAllister & McMahon LLC (57) ABSTRACT

A wildlife guard assembly is provided that includes two cover sections, a biasing member, and a toggle action lever mechanism. The cover sections are hinged so that the cover sections, when in a closed position, a cavity to capture a line post insulator is defined. The biasing member normally biases the cover sections to the closed position. The lever mechanism is connected to the cover sections and has an over-center position that releasably holds the two cover sections in an open position. The lever mechanism is positioned in the cavity such that, during installation on the line post insulator, the line post insulator interacts with the lever mechanism to move the lever mechanism from the over-center position to allow the biasing member and the lever mechanism to move the cover sections to the closed position.

20 Claims, 9 Drawing Sheets

(56) References Cited

FOREIGN PATENT DOCUMENTS

| | | |
|---|---|---|
| EP | 3001205 | 3/2016 |
| GB | 2589151 | 5/2021 |
| JP | 201597445 A | 5/2015 |
| KR | 20140002686 U | 5/2014 |
| KR | 20150042111 | 4/2015 |
| KR | 20200000068 | 1/2020 |
| WO | 2010128929 | 11/2010 |

WILDLIFE GUARD ASSEMBLIES FOR LINE POST INSULATORS

CROSS REFERENCE TO RELATED APPLICATIONS

This application claims the benefit of U.S. Application 63/256,770 filed Oct. 18, 2021, the entire contents of both of which are incorporated by reference herein.

BACKGROUND

1. Field of the Invention

The present disclosure is related to wildlife guard assemblies for line post insulators. More specifically, the present disclosure relates to wildlife guard assemblies that can be placed on line post insulators using a lineman hotstick and/or while the insulators are energized.

2. Description of Related Art

Line post insulators are commonly used in modern electrical distribution and transmission systems. The line post insulators are made of porcelain or composite material that are operatively coupled to electrical conductors. The line post insulators can be mounted on a utility pole and towers in various positions including horizontally, vertically, and angles therebetween.

Electric poles, towers, including substations provide attractive locations for wildlife such as birds, squirrels, and others to perch and/or nest. The perching or nesting can result in an electrocution hazard for the wildlife, can damage the line post insulators, can damage the conductors connected to the insulators, can cause power outages in remote or hard to access locations, and can create a fire hazard to the surrounding environment.

Thus, a number of solutions have been proposed for guarding or covering electrical transmission and distribution gear from wildlife. However, it has been found that many prior art guards can be expensive to make, can be difficult to install, can require the lines/equipment to be de-energized during installation, can fail to remain in the desired location on the equipment, and others identified issues.

Accordingly, there is a need for wildlife guard assemblies that address overcome, alleviate, and/or mitigate one or more of the aforementioned and other deleterious effects of the prior art.

SUMMARY

A wildlife guard assembly for a line post insulator is provided. The assembly includes two cover sections, a biasing member, and a toggle action lever mechanism. The cover sections are hinged for movement about a hinge axis between a closed position and an open position. The cover sections, when in the closed position, define a cavity sufficient to capture the line post insulator. The biasing member normally biases the cover sections to the closed position. The toggle action lever mechanism is connected to the two cover sections and has an over-center position that corresponds with the open position. The toggle action lever mechanism releasably holds the two cover sections in the open position when in the over-center position. The toggle action lever mechanism is positioned in the cavity such that, during installation on the line post insulator, the line post insulator interacts with the toggle action lever mechanism to move the toggle action lever mechanism from the over-center position to allow the biasing member and the toggle action lever mechanism to move the two cover sections to the closed position.

In some embodiments either alone or together with any one or more of the aforementioned and/or after-mentioned embodiments, the cover sections are identically shaped.

In some embodiments either alone or together with any one or more of the aforementioned and/or after-mentioned embodiments, the cover sections include a hotstick engaging region.

In some embodiments either alone or together with any one or more of the aforementioned and/or after-mentioned embodiments, at least one of the two cover sections includes a hotstick engaging region.

In some embodiments either alone or together with any one or more of the aforementioned and/or after-mentioned embodiments, the biasing member is one or more torsion springs disposed about the hinge axis.

In some embodiments either alone or together with any one or more of the aforementioned and/or after-mentioned embodiments, the two cover sections include a first section and a second section. The first section has a first hinge pin and a first hinge knuckle, while the second section has a second hinge pin and a second hinge knuckle. The first hinge pin is movably secured to the second hinge knuckle and the second hinge pin is movably secured to the first hinge knuckle so that the first and second sections are movable about the hinge axis.

In some embodiments either alone or together with any one or more of the aforementioned and/or after-mentioned embodiments, the two cover sections include a structural rib protruding therefrom and defining a hollow region in the cavity.

In some embodiments either alone or together with any one or more of the aforementioned and/or after-mentioned embodiments, the hollow region is sized and positioned to receive the toggle action lever mechanism when in the closed position.

In some embodiments either alone or together with any one or more of the aforementioned and/or after-mentioned embodiments, the toggle action lever mechanism, when in the closed position, cooperates with the structural rib to provide strength and resistance to bending/warping to the two cover sections.

In some embodiments either alone or together with any one or more of the aforementioned and/or after-mentioned embodiments, the two cover sections each have at least one conductor covering portion depending therefrom that form a semi-circular region such that, when in the closed position, interact to form a region that completely encircles or captures an electrical conductor operatively coupled to the line post insulator.

In some embodiments either alone or together with any one or more of the aforementioned and/or after-mentioned embodiments, a further conductor cover having a rib is provided. The further conductor cover is positioned on the electrical conductor and the at least one conductor covering portions with the rib operatively engaging a shoulder of the at least one conductor covering portion.

A wildlife guard assembly is also provided that includes two cover sections, a biasing member, and a toggle action lever mechanism. The cover sections are hinged for movement about a hinge axis between an open position and closed position, which defines a cavity sufficient to capture the line post insulator between the cover sections. The cover sections each have a structural rib protruding therefrom, which defines a hollow region in the cavity. The biasing member normally bias the two cover sections to the closed position. The toggle action lever mechanism is connected to the two cover sections and has an over-center position that that corresponds with the open position. The toggle action lever mechanism releasably holds the two cover sections in the open position when in the over-center position. The hollow region is sized and positioned to receive the toggle action lever mechanism when in the closed position.

In some embodiments either alone or together with any one or more of the aforementioned and/or after-mentioned embodiments, the toggle action lever mechanism, when in the closed position, cooperates with the structural rib to provide strength and resistance to bending/warping to the two cover sections.

In some embodiments either alone or together with any one or more of the aforementioned and/or after-mentioned embodiments, the toggle action lever mechanism is positioned in the cavity such that, during installation on the line post insulator, the line post insulator interacts with the toggle action lever mechanism to move the toggle action lever mechanism from the over-center position to allow the biasing member and the toggle action lever mechanism to move the two cover sections to the closed position.

In some embodiments either alone or together with any one or more of the aforementioned and/or after-mentioned embodiments, the two cover sections are identically shaped.

A method of installing a wildlife guard assembly on a line post insulator is provided. The method includes pivoting two cover sections of the wildlife guard assembly about a hinge axis to an open position by overcoming a biasing member such that a toggle action lever mechanism within the wildlife guard assembly moves to an over-center position that holds the two cover sections in the open position and then placing the wildlife guard assembly over the line post insulator. The placing step includes interacting the toggle action lever mechanism and the line post insulator such that the toggle action lever mechanism moves from the over-center position allowing the biasing member and the toggle action lever mechanism to move the two cover sections to a closed position capturing the line post insulator in the wildlife guard assembly.

In some embodiments either alone or together with any one or more of the aforementioned and/or after-mentioned embodiments, the step of placing the wildlife guard assembly includes connecting a lineman hotstick to the wildlife guard assembly and using the lineman hotstick to move the wildlife guard assembly into position on the line post insulator.

In some embodiments either alone or together with any one or more of the aforementioned and/or after-mentioned embodiments, the step of placing the wildlife guard assembly includes leaving the line post insulator energized.

In some embodiments either alone or together with any one or more of the aforementioned and/or after-mentioned embodiments, the two cover sections of the wildlife guard assembly each include conductor covering portions depending therefrom such that the interacting step further includes allowing the biasing member and the toggle action lever mechanism to move the two cover sections to the closed position capturing at least a portion of an electrical conductor in operative communication with the line post insulator in the wildlife guard assembly.

In some embodiments either alone or together with any one or more of the aforementioned and/or after-mentioned embodiments, the conductor covering portions further include a shoulder depending therefrom, the method further including the step of placing a conductor cover over the conductor so that a rib defined in the conductor cover captures the shoulder.

The above-described and other features and advantages of the present disclosure will be appreciated by those skilled in the art from the detailed description, drawings, and appended claims.

DETAILED DESCRIPTION

Figure 1:
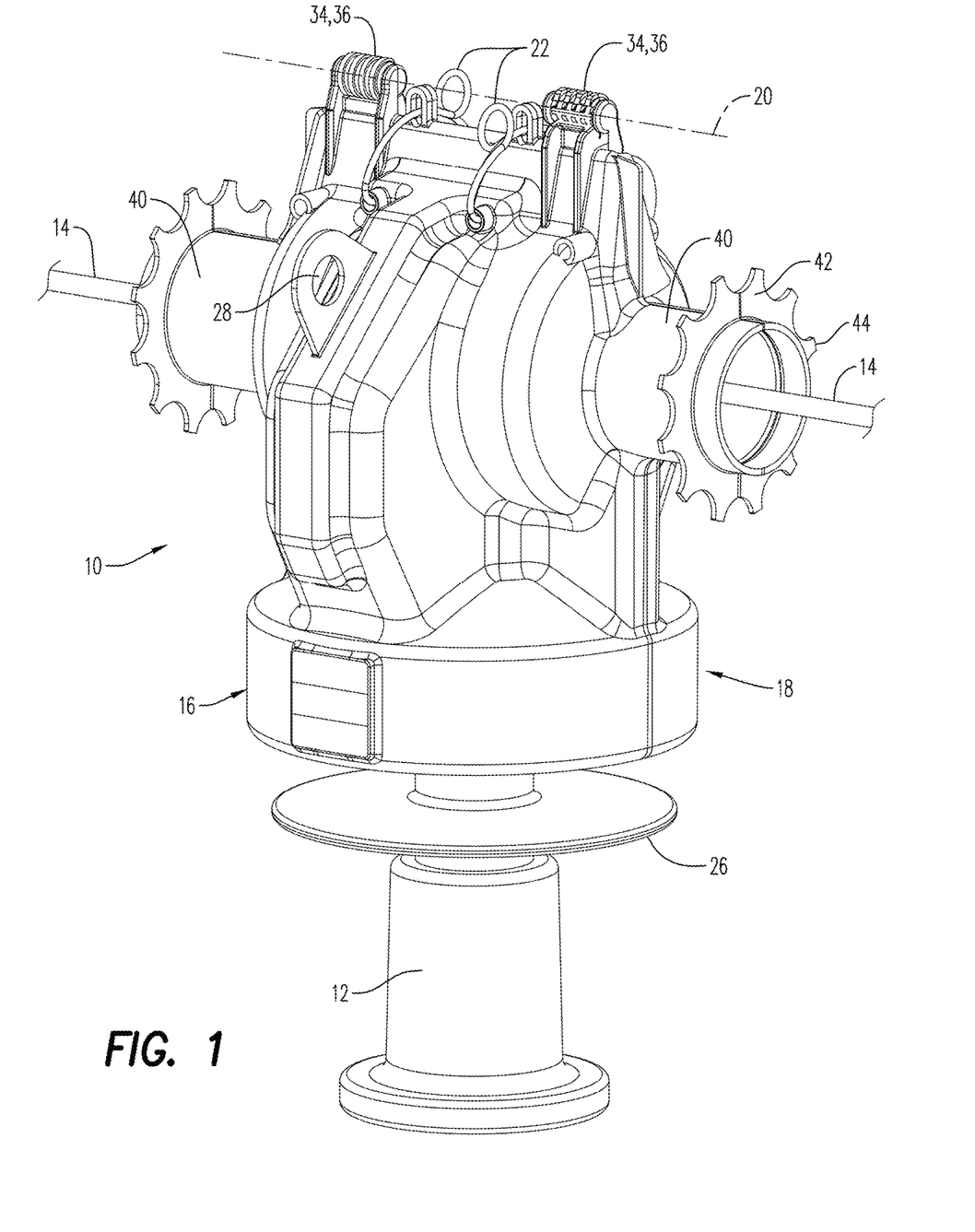
FIG. 1 is a first perspective view of an exemplary embodiment of a wildlife guard assembly according to the present disclosure as installed on a line post insulator and electrical conductor.
Figure 2:
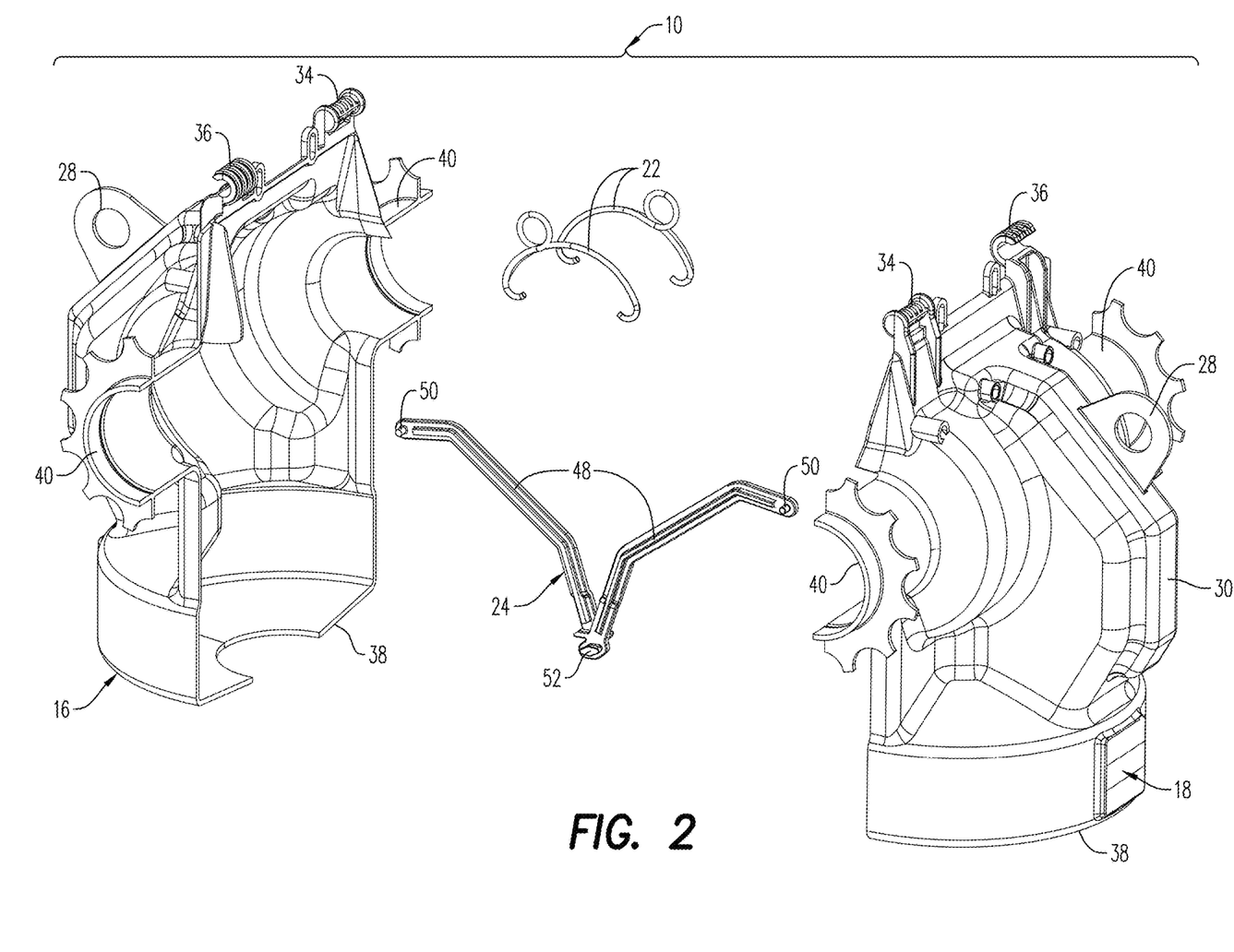
FIG. 2 is a disassembled view of the assembly of FIG. 1.
Figure 3:
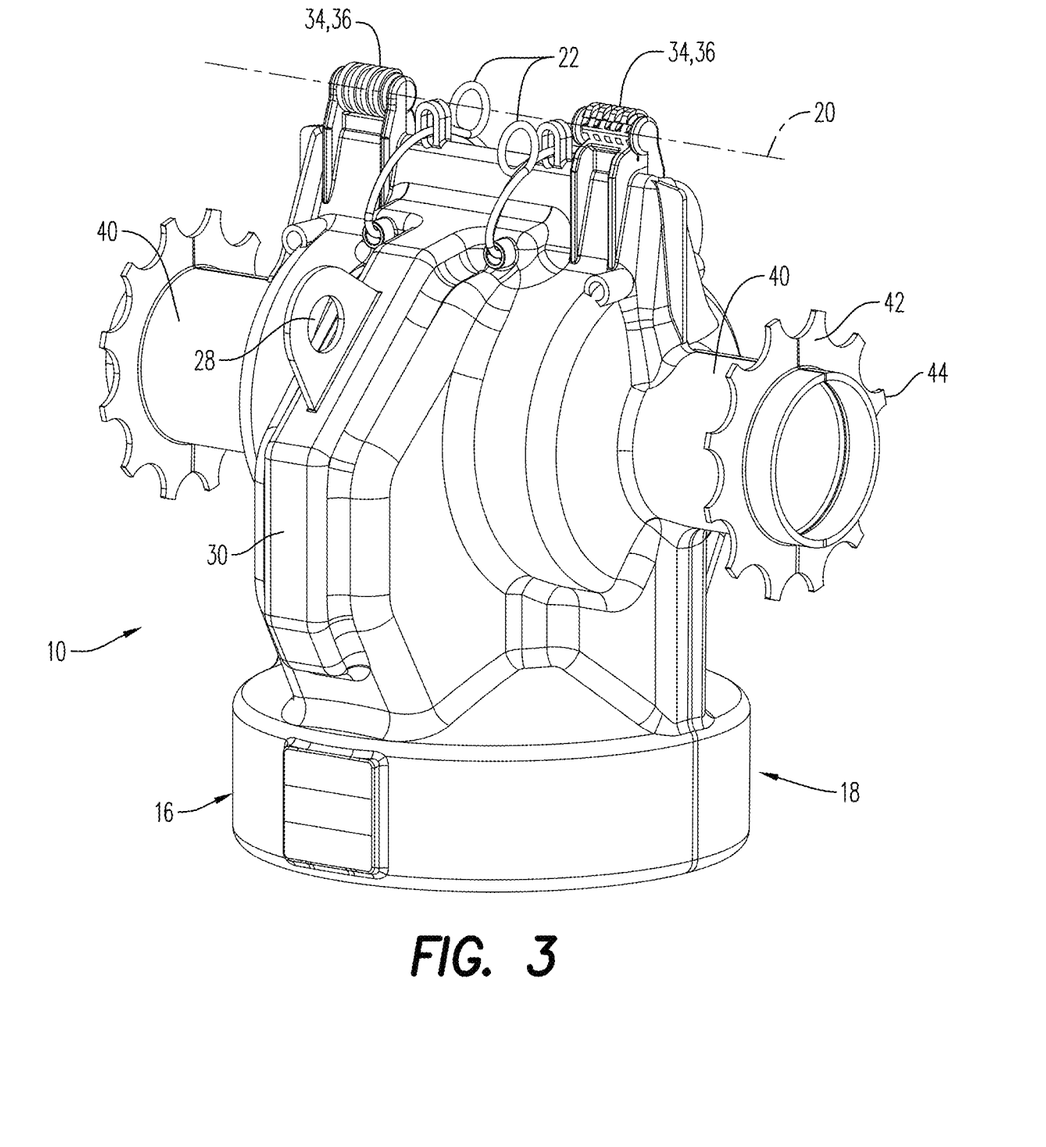
FIG. 3 is a perspective view of the assembly of FIG. 1 in a closed position.

Referring to the drawings and in particular to FIGS. 1-3, an exemplary embodiment of a wildlife guard assembly according to the present disclosure is shown and is generally referred to by reference numeral 10. Advantageously, assembly 10 is configured so that it can be installed on a line post insulator 12 while energized by an electrical conductor 14 with the use of only one lineman hotstick (not shown). Insulator 12 is shown by way of example in a vertical position. However, it is contemplated by the present disclosure for assembly 10 to function when insulator 12 is in any desired position.

Assembly 10 has two cover sections 16, 18 that are hinged at an upper extent for movement about a hinge axis 20 between an open position (FIG. 4) and a closed position (FIG. 3). Assembly 10 further includes one or more biasing members 22 (two shown) that normally bias sections 16, 18 to the closed position (FIG. 1). Sections 16, 18 define, in the closed position, an inner cavity (C) sufficient to capture operative portions of insulator 12.

Figure 4:
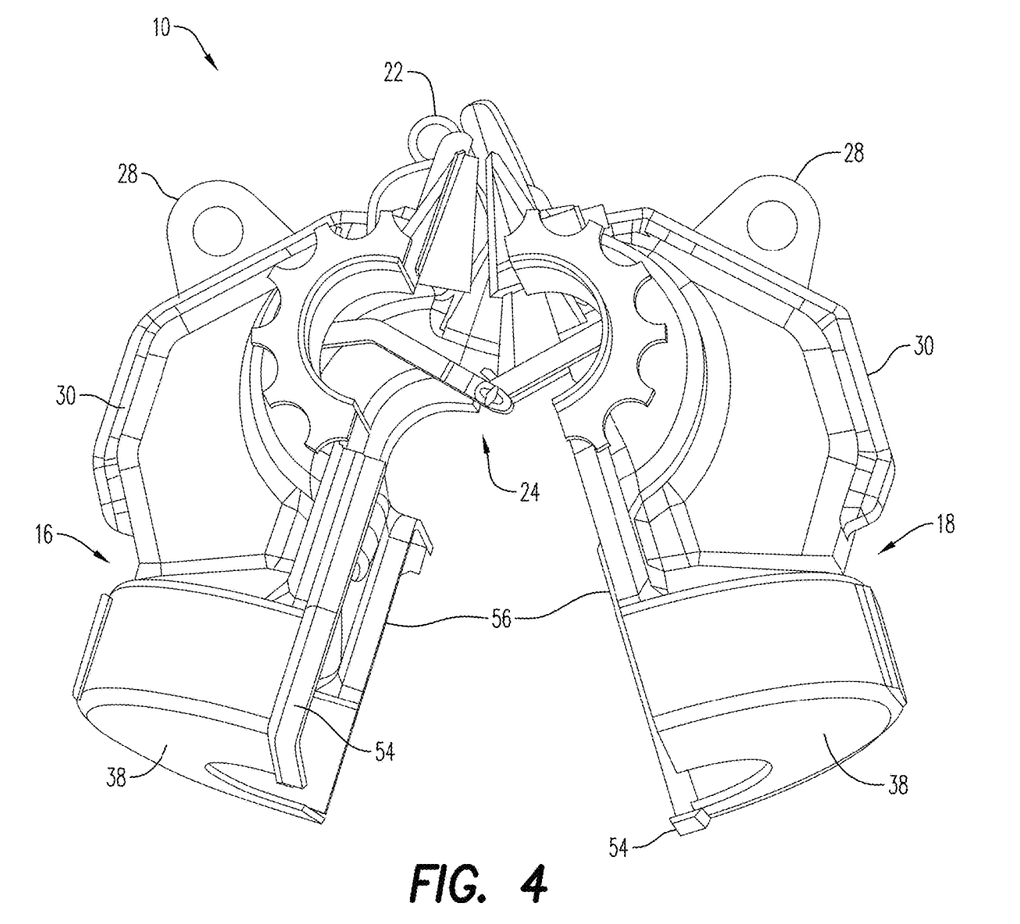
FIG. 4 is a perspective view of the assembly of FIG. 1 in an open position.

Assembly 10 further includes a toggle action lever mechanism 24 positioned in cavity (C) that can releasably hold sections 16, 18 in the open position (FIG. 4). Lever mechanism 24, when in the open position of FIG. 4, holds sections 16, 18 in the open position against the action of biasing members 22. However, movement of lever mechanism 24 from the open position allows biasing members 22 to close sections 16, 18— and allows the biasing members to hold the sections in the closed position around insulator 12.

More specifically and as will be disclosed in more detail herein below, lever mechanism 24 has an over-center lock point (i.e., the open position of FIG. 4) that includes a fixed stop to prevent over opening of sections 16, 18. Once lever mechanism 24 is in the over-center position, sections 16, 18 cannot move or close unless the lever mechanism is moved from the over-center position.

Lever mechanism 24 is positioned in cavity (C) of assembly 10 so that the lever mechanism contacts or interacts with a portion of insulator 12 during installation of the assembly. Thus, the same movement used to move assembly 10 onto insulator 12 also results in movement of lever mechanism 24 from the over-center position—allowing biasing members 22 to close sections 16, 18 onto insulator 12.

Assembly 10 is configured so that sections 16, 18— when in the closed position—clamp around and capture conductor 14 and at least one a feature of insulator 12. In the illustrated embodiment, sections 16, 18 capture an insulator shed profile 26 of insulator 12. Of course, it is contemplated by the present disclosure for sections 16, 18 to capture other portions of insulator 12.

Assembly 10 is further configured for installation onto insulator via a single lineman hotstick. Specifically, at least one of sections 16, 18 can, in some embodiments, further include a hotstick engaging region 28. Region 28 can be as simple as an opening that can be engaged by a hook of a hotstick (not shown) in a known manner. In this manner, assembly 10 can be engaged by the hotstick and safely installed onto insulator 12 and conductor 14 while the conductor is energized.

In the illustrated embodiment, sections 16, 18 each include region 28 formed as a tab depending from the sections, respectively. In some embodiments, region 28 depends from an outwardly protruding structural rib 30 on each section 16, 18. Structural rib 30 is configured to withstand the forces imparted from region 28 to sections 16, 18 during installation via the hotstick.

In some embodiments, structural rib 30 forms a hollow region 32 inside of sections 16, 18— where this hollow region is sized and positioned to receive lever mechanism 24 when in the closed position.

In the illustrated embodiment, sections 16, 18 can have an identical shape—such that assembly 10 can be formed by connecting the two identical sections to one. As such, assembly 10 has a reduced number of components that improves the ease of manufacture and assembly. Of course, it is contemplated by the present disclosure for sections 16, 18 to have shapes that differ from one another.

Each section 16, 18 has a hinge pin 34 and a hinge knuckle 36. During assembly, hinge pin 34 of section 16 is pivotally secured in hinge knuckle 36 of section 18, while the hinge pin 34 of section 18 is pivotally secured in hinge knuckle 36 of section 16. When secured to one another, hinge pins 34 and hinge knuckles 36 are disposed along hinge axis 20 so that sections 16, 18 can move about the hinge axis.

In some embodiments, knuckles 36 resiliently flex to secure pins 34 in the knuckles, while allowing movement of sections 16, 18 about hinge axis 20 after connection of the sections to one another. Of course, other connections between sections 16, 18 that allow for pivoting movement about hinge axis 20 are contemplated by the present disclosure.

Sections 16, 18 are made of any insulating material having sufficient strength and toughness to withstand ambient environmental conditions, while having sufficient resilience to allow knuckles 36 to flex over pins 3 during assembly. In some embodiments, sections 16, 18 are made of polypropylene or other polymeric materials.

Biasing members 22 can be any member sufficient to provide a biasing force to sections 16, 18 about hinge axis 20 to bias the sections to the normally closed position (FIG. 1) and to provide a clamping force secure sections 16, 18 onto insulator 12 and conductor 14. In the illustrated embodiment, biasing members 22 is are shown as torsion springs. Of course, other biasing members 22 such as, but not limited to, compression springs, extension springs, and others are contemplated for use by the present disclosure.

Insulator 12 can have many different configurations—with conductor 14 entering and exiting from the insulator in different areas. Thus in some embodiments, sections 16, 18 can, in the closed position, form a closed cover that is only open for insulator 12 to pass through at base cover 38, which is remote from hinge axis 20.

In the illustrated embodiment where conductor 14 enters and exits insulator 12 from opposite sides (i.e., offset by 180 degrees), sections 16, 18 can further include have conductor covering portions 40 depending therefrom. Each portion 40 forms a semi-circular region that, when assembly 10 is closed, form in region that completely encircles or captures conductor 14.

Conductor covering portions 40 can—in some embodiments—include a shoulder 42 depending therefrom—and can include one or more features 44 defined on the shoulder 42. Shoulder 42 and, when present, features 44, can be engaged by further conductor covers 46 shown in FIGS. 8 and 9 as will be described in more detail below.

Lever mechanism 24 can be any over-center toggle mechanism. In the illustrated embodiment, lever mechanism 24 has two levers 48 that have a first pivot point 50 at sections 16, 18, respectively, and a central pivot point 52. The installation of assembly 10 onto insulator 12 and conductor 14—as well as the movements of lever mechanism 24—are described in more detail with respect to FIGS. 5-7.

Figure 5:
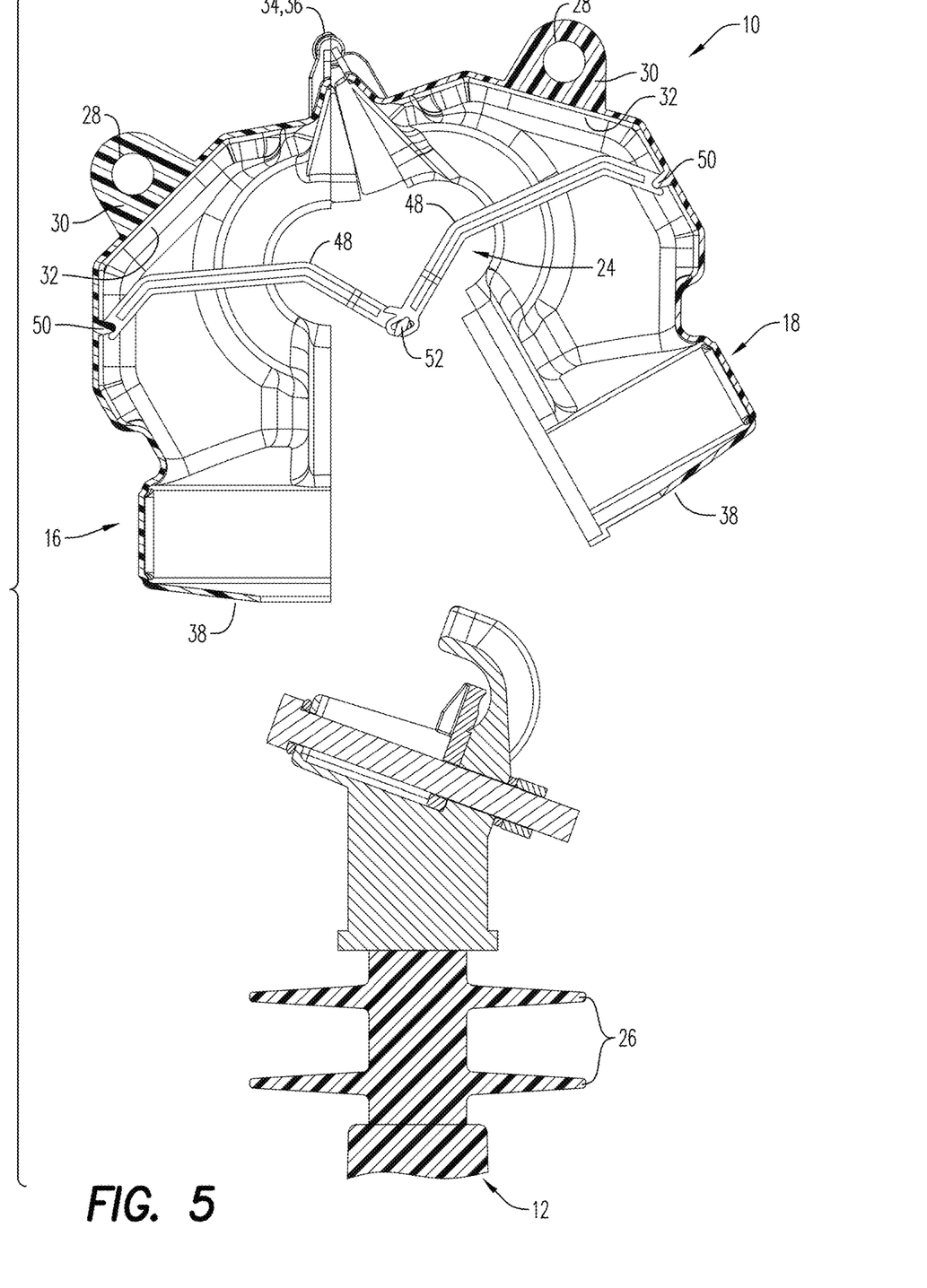
FIG. 5 is a perspective view of the assembly of FIG. 1 during an initial stage of installation on the line post insulator.

FIG. 5 illustrates assembly 10 before installation onto insulator 12 and conductor 14. Here, assembly 10 is shown in the open position, with lever mechanism 24 in the over-center position—in which sections 16, 18 are held by the lever mechanism in the open position.

Figure 6:
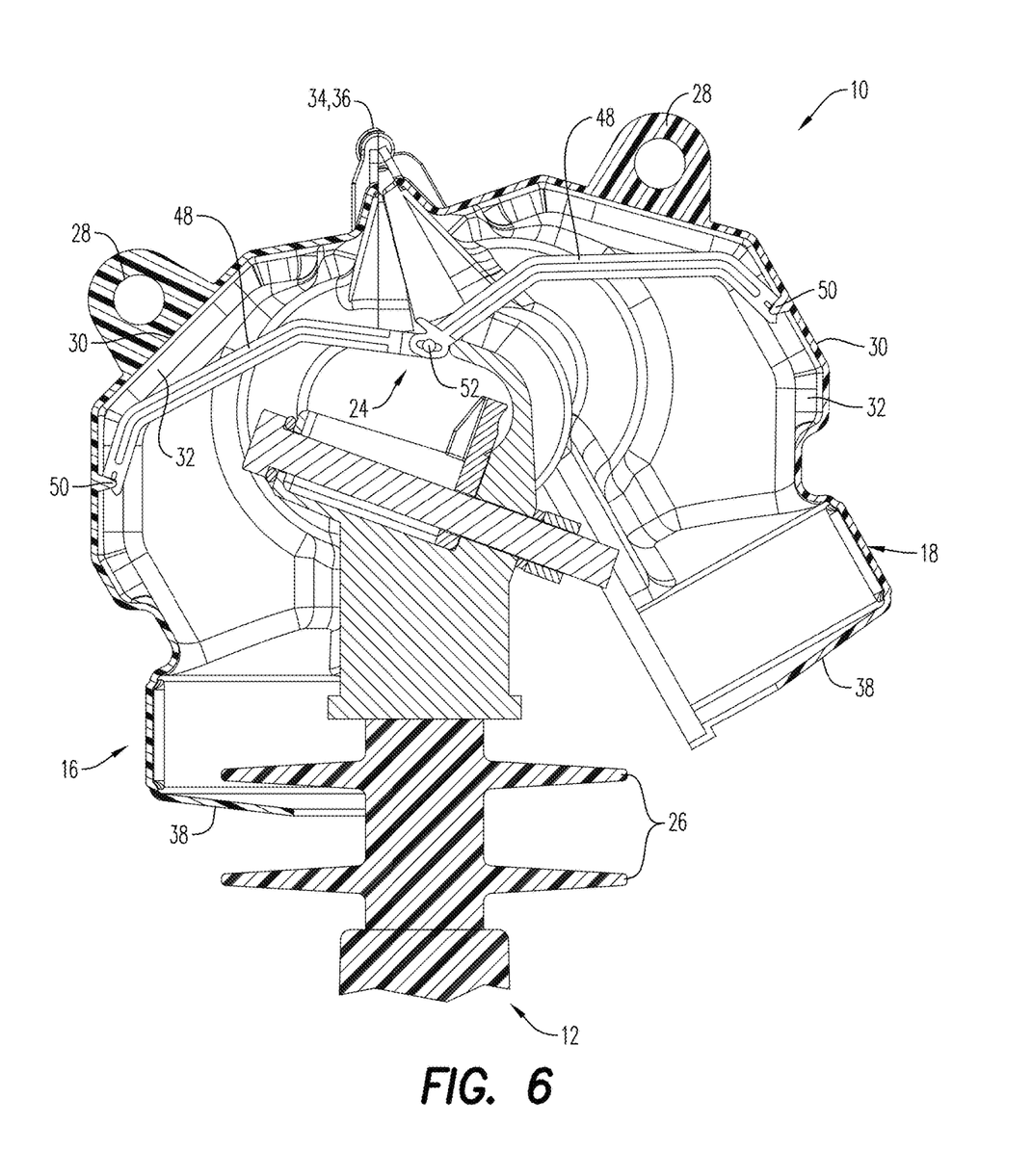
FIG. 6 is a section view of the assembly during an intermediate stage of installation on the line post insulator.

FIG. 6 illustrates assembly 10 during installation onto insulator 12 and conductor 14. Here, base cover 38 of section 16 is positioned below shed profile 26 of insulator 12 and assembly 10 is moved with respect to the insulator until one of levers 48 comes into contact or interacts with the insulator.

The contact or interaction between lever 48 and insulator 12 moves lever mechanism 24 out of the over-center position, with both levers 48 pivoting about pivot points 50, 52, respectively. The movement of levers 48 pulls sections 16, 18 inward towards one another, capturing insulator 12 between the sections and capturing conductor 14 between conductor covering portions 40. It can be seen that the movement levers 48 is such that the levers are moving into hollow region 32 formed by structural rib 30 at least at pivot points 50.

Figure 7:
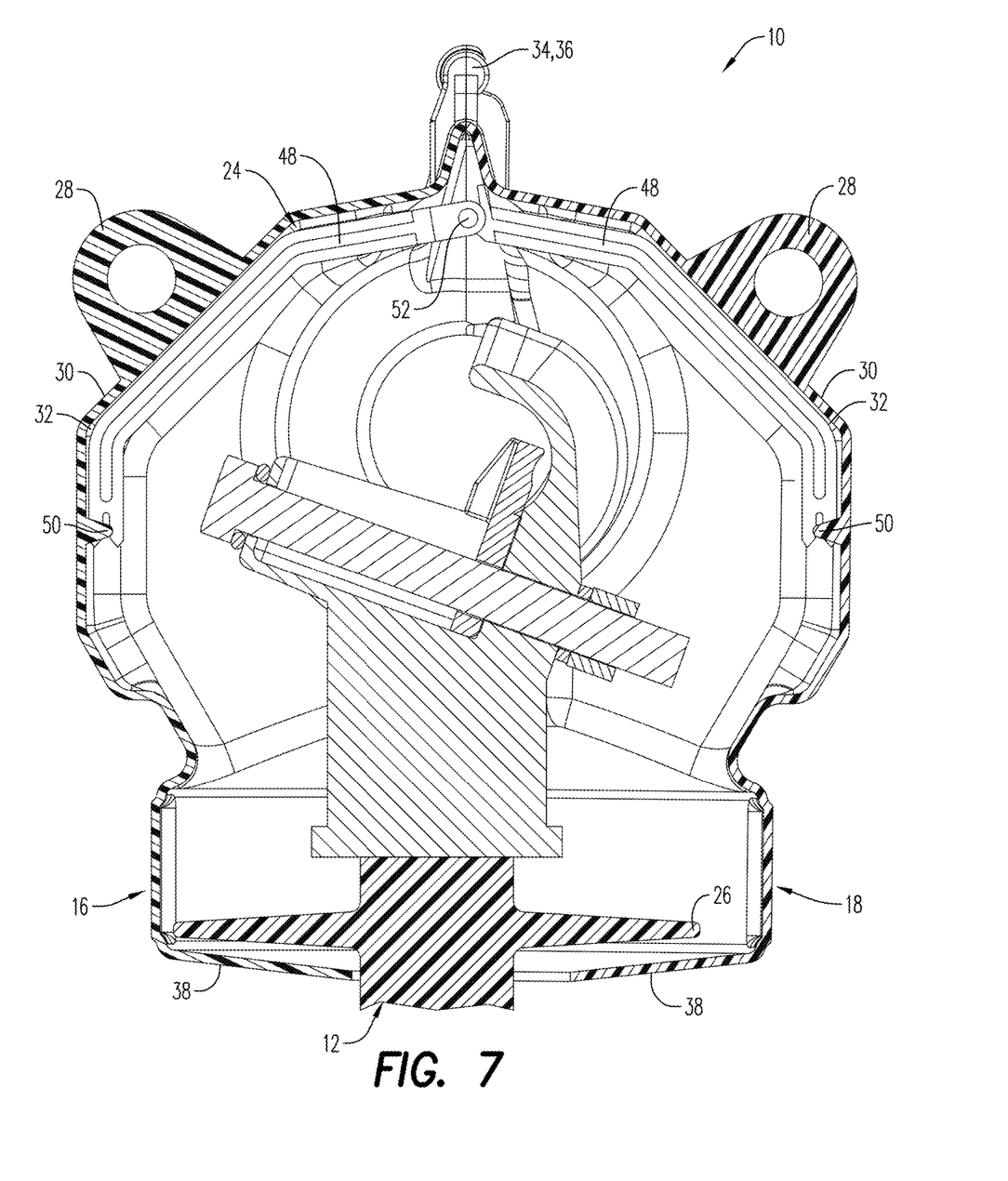
FIG. 7 is a sectional view of the assembly during a final stage of installation on the line post insulator.

FIG. 7 illustrates assembly 10 after installation onto insulator 12 and conductor 14. Here, assembly 10 is shown in the closed position, with lever mechanism 24 received in hollow region 32 formed by structural rib 30, sections 16, 18 in contact with one another capturing the insulator, and with conductor 14 captured between conductor covering portions 40.

In the closed position with lever mechanism 24 positioned in hollow region 32, the lever mechanism can cooperate with structural rib 30 to provide enhanced strength and resistance to bending/warping of assembly 10.

During movement from the open position of FIG. 5 and the partially closed position of FIG. 6, biasing members 22 assist in the movement of sections 16, 18 towards one another. Further, after movement to the closed position of FIG. 7, biasing members 22 assist in maintaining sections 16, 18 in the closed position and capturing insulator 12 and conductor 14—namely providing a clamping force on the assembly.

It is generally desired for assembly 10 to eliminate gaps into which wildlife can pass into the assembly and into contact with insulator 12 and/or conductor 14. Thus, assembly 10 is configured to minimize gaps between sections 16, 18.

For example and as shown in FIG. 4, sections 16, 18 can, in some embodiments, include a lip 54 along one edge. In the closed position, lip 54 closes over the opposing edge 56 to eliminate gaps between sections 16, 18.

In other embodiments, gaps can be mitigated by providing base 38 with an opening having an inner dimension approximately equal to an outer dimension of insulator 12. Similarly, gaps can be mitigated by providing conductor covering portions 40 with an opening having an inner dimension approximately equal to an outer dimension of conductor 14. Of course, other gap mitigation techniques are contemplated by the present disclosure.

Figure 8:
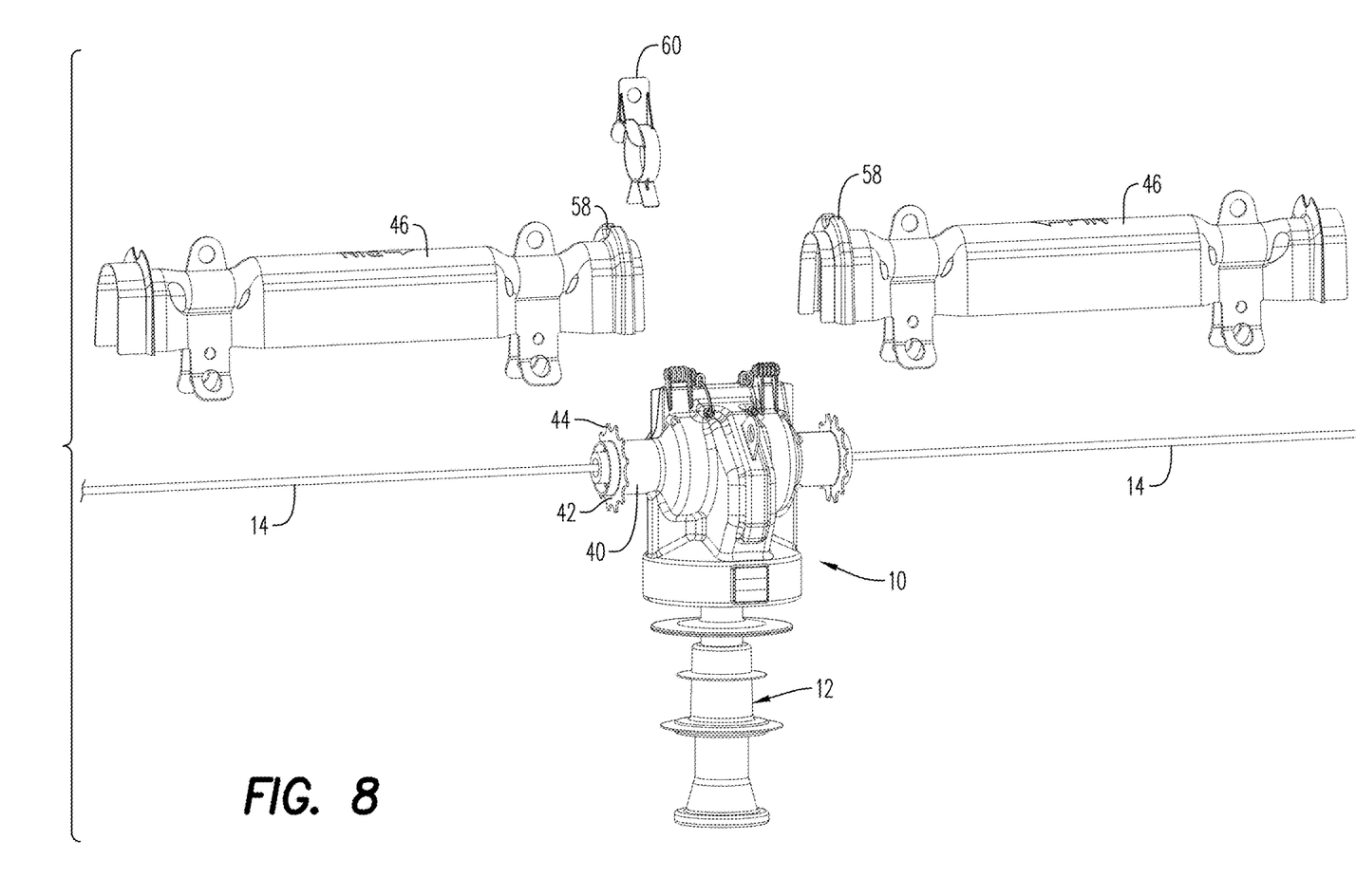
FIG. 8 is a perspective view of the assembly during installation of conductor guards.
Figure 9:
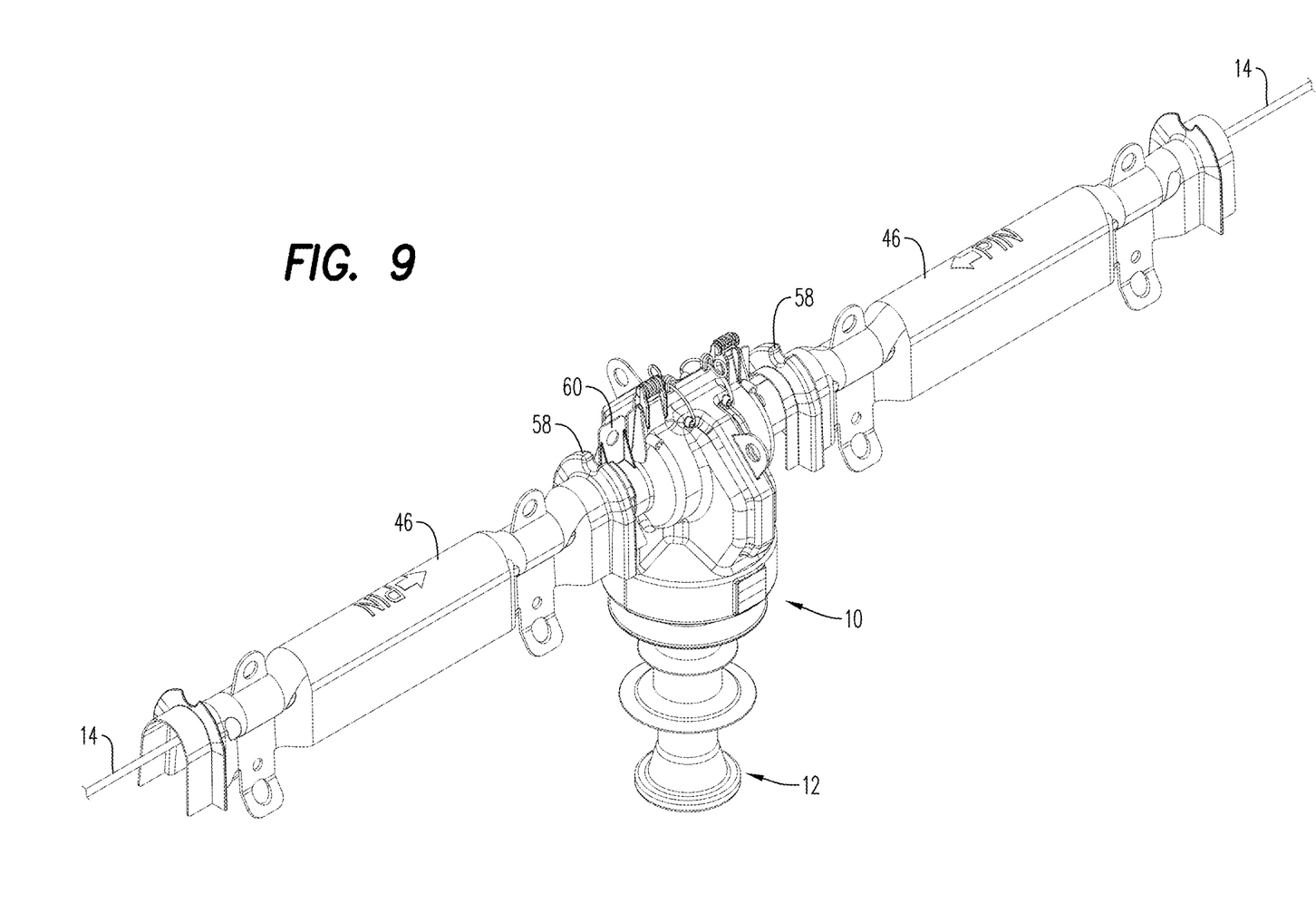
FIG. 9 is a perspective view of the assembly of FIG. 8 after installation of the conductor guards.

In some embodiments, assembly 10 is further configured to eliminate gaps via conductor covering portions 40, which is described in more detail with reference to FIGS. 8-9. As noted above, conductor covering portions 40 can include shoulder 42 with features 44 defined on the shoulder. Shoulder 42 and, when present, features 44, can be engaged by a corresponding rib 58 defined in conductor covers 46.

Here, conductor covers 46 can be positioned over conductor 14 via a hotstick in a known manner such that shoulder 42 is received in rib 58 of the conductor covers. When features 44 are present on shoulder 42, the features can interact with corresponding features (not shown) in rib 58 to mitigate rotation of assembly 10 and conductor covers 46 with respect to one another about conductor 14.

Conductor covers 46 are configured to couple with commercially available rubber line hose and insulator covers (not shown). In some embodiments, conductor covers 46 are made of polypropylene and are gray in color and can be, for example, 2 feet long and are available with a Grip-All adapter for hot stick application or without adapter for rubber glove application.

When desired, gaps can even further be eliminated by way of clips 60 that can be positioned over the interface between conductor covering portions 40 of assembly 10 and conductor covers 46. Clips 60 aide in retention of conductor covers 46. As insulator 12 can be position in various angles in relation to ground level, conductor covers 46 can be timed (i.e., positioned angularly) to the assembly 10 by features 44. Therefore, regardless the angle of insulator 12 and, thus, assembly 10, conductor covers 46 can be position in a vertical orientation with the opening at the bottom facing towards the ground—providing protection to perching wildlife. Clips 60 can ensure the notch on conductor covers 46 coincide with the notches on each conductor covering portions 40 of sections 16, 18, respectively.

As disclosed herein, assembly 10 provides a simple to use design of very few components. Assembly 10 is configured to hold itself in the open position, then close by the same movement of the assembly with respect to insulator 12 via a hotstick while the insulator is energized. Assembly 10 captures insulator 12 and conductors 14 while minimizing gaps. The simple design of assembly 10 allows for installation on insulators 12 that are in a variety of positions—vertical, horizontal, and angles therebetween.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST wildlife guard assembly 10
line post insulator 12
electrical conductor 14
cover sections 16, 18
hinge axis 20
biasing members 22
toggle action lever mechanism 24
inner cavity C
insulator shed profile 26
hotstick engaging region 28
structural rib 30
hollow region 32
hinge pin 34
hinge knuckle 36
base cover 38
conductor covering portions 40
shoulder 42
features 44
further conductor covers 46
levers 48
first pivot point 50
central pivot point 52
lip 54
opposing edge 56
rib 58
clips 60

What is claimed is:

1. A wildlife guard assembly for a line post insulator, comprising:
    two cover sections hinged at an upper extent for movement about a horizontal hinge axis between a closed position and an open position, the two cover sections, when in the closed position, defining a cavity sufficient to capture the line post insulator;
    a biasing member that normally bias the two cover sections to the closed position; and
    a toggle action lever mechanism connected to the two cover sections, the toggle action lever mechanism having an over-center position that corresponds with the open position,
    wherein the toggle action lever mechanism releasably holds the two cover sections in the open position when in the over-center position,
    wherein the toggle action lever mechanism is positioned in the cavity such that, during installation on the line post insulator, the line post insulator interacts with the toggle action lever mechanism to move the toggle action lever mechanism from the over-center position to allow the biasing member and the toggle action lever mechanism to move the two cover sections to the closed position.

2. The assembly of claim 1, wherein the two cover sections are identically shaped.

3. The assembly of claim 2, wherein the two cover sections further comprise a hotstick engaging region.

4. The assembly of claim 1, wherein at least one of the two cover sections further comprise a hotstick engaging region.

5. The assembly of claim 1, wherein the biasing member comprises one or more torsion springs disposed about the hinge axis.

6. The assembly of claim 1, wherein the two cover sections comprise:
   a first section having a first hinge pin and a first hinge knuckle; and
   a second section having a second hinge pin and a second hinge knuckle,
   wherein the first hinge pin is movably secured to the second hinge knuckle and the second hinge pin is movably secured to the first hinge knuckle so that the first and second sections are movable about the hinge axis.

7. The assembly of claim 1, wherein the two cover sections further comprise a structural rib protruding therefrom and defining a hollow region in the cavity.

8. The assembly of claim 7, wherein the hollow region is sized and positioned to receive the toggle action lever mechanism when in the closed position.

9. The assembly of claim 8, wherein the toggle action lever mechanism, when in the closed position, cooperates with the structural rib to provide strength and resistance to bending/warping to the two cover sections.

10. The assembly of claim 1, wherein the two cover sections each comprise at least one conductor covering portions depending therefrom that form a semi-circular region such that, when in the closed position, interact to form a region that completely encircles or captures an electrical conductor operatively coupled to the line post insulator.

11. The assembly of claim 10, further comprising a further conductor cover having a rib, the further conductor cover being configured to be positioned on the electrical conductor and the at least one conductor covering portions with the rib operatively engaging a shoulder of the at least one conductor covering portion.

12. A wildlife guard assembly, comprising:
    two cover sections hinged for movement about a hinge axis between an open position and closed position, which defines a cavity sufficient to capture the line post insulator between the cover sections, the two cover sections each having a structural rib protruding outward therefrom, wherein the structural rib defines a hollow region in the cavity;
    a biasing member that normally bias the two cover sections to the closed position; and
    a toggle action lever mechanism connected to the two cover sections, the toggle action lever mechanism having an over-center position that corresponds with the open position,
    wherein the toggle action lever mechanism releasably holds the two cover sections in the open position when in the over-center position, and
    wherein the hollow region is sized and positioned to receive the toggle action lever mechanism when in the closed position.

13. The assembly of claim 12, wherein the toggle action lever mechanism, when in the closed position, cooperates with the structural rib to provide strength and resistance to bending/warping to the two cover sections.

14. The assembly of claim 12, wherein the toggle action lever mechanism is positioned in the cavity such that, during installation on the line post insulator, the line post insulator interacts with the toggle action lever mechanism to move the toggle action lever mechanism from the over-center position to allow the biasing member and the toggle action lever mechanism to move the two cover sections to the closed position.

15. The assembly of claim 12, wherein the two cover sections are identically shaped.

16. A method of installing a wildlife guard assembly on a line post insulator, comprising:
    pivoting two cover sections of the wildlife guard assembly about a horizontal hinge axis to an open position by overcoming a biasing member such that a toggle action lever mechanism within the wildlife guard assembly moves to an over-center position that holds the two cover sections in the open position; and
    placing the wildlife guard assembly over a top of the line post insulator, wherein the placing step further comprises:
    interacting the toggle action lever mechanism and the line post insulator such that the toggle action lever mechanism moves from the over-center position allowing the biasing member and the toggle action lever mechanism to move the two cover sections to a closed position capturing the line post insulator in the wildlife guard assembly.

17. The method of claim 16, wherein the step of placing the wildlife guard assembly comprises: connecting a lineman hotstick to the wildlife guard assembly; and
    using the lineman hotstick to move the wildlife guard assembly into position on the line post insulator.

18. The method of claim 17, wherein the step of placing the wildlife guard assembly further comprises leaving the line post insulator energized.

19. The method of claim 16, wherein the two cover sections of the wildlife guard assembly each comprise conductor covering portions depending therefrom such that the interacting step further comprises:
    allowing the biasing member and the toggle action lever mechanism to move the two cover sections to the closed position capturing at least a portion of an electrical conductor in operative communication with the line post insulator in the wildlife guard assembly.

20. The method of claim 19, wherein the conductor covering portions further comprise a shoulder depending therefrom, the method further comprising:
    placing a conductor cover over the conductor so that a rib defined in the conductor cover captures the shoulder.

* * * * *